United States Patent
Yoon et al.

(10) Patent No.: US 8,165,722 B2
(45) Date of Patent: Apr. 24, 2012

(54) VELOCITY AND CONCENTRATION ADJUSTABLE COUPLING PIPE APPARATUS EQUIPPED BETWEEN LIFTING PIPE AND COLLECTOR

(75) Inventors: Chi-Ho Yoon, Daejeon (KR); Byung-Sik Ahn, Daejeon (KR); Jong-Myung Park, Daejeon (KR)

(73) Assignee: Korea Institute of Geoscience And Mineral Resources (KIGAM) (KR)

( * ) Notice: Subject to any disclaimer, the term of this patent is extended or adjusted under 35 U.S.C. 154(b) by 231 days.

(21) Appl. No.: 12/754,848

(22) Filed: Apr. 6, 2010

(65) Prior Publication Data

US 2011/0218685 A1 Sep. 8, 2011

(30) Foreign Application Priority Data

Mar. 2, 2010 (KR) ........................ 10-2010-0018683

(51) Int. Cl.
*G05D 7/00* (2006.01)
*G05D 11/00* (2006.01)
*G05D 1/10* (2006.01)
*E02D 17/16* (2006.01)
*E02F 3/00* (2006.01)
*E02F 3/90* (2006.01)
*G01F 1/00* (2006.01)
*B63C 11/48* (2006.01)
*B63C 7/22* (2006.01)

(52) U.S. Cl. .............. 700/282; 700/304; 299/8; 37/307; 37/309; 37/314; 37/317; 37/335; 37/336

(58) Field of Classification Search .................. 700/282, 700/304; 299/8; 37/307, 309, 314, 317, 37/335, 336
See application file for complete search history.

(56) References Cited

U.S. PATENT DOCUMENTS

| | | | | | |
|---|---|---|---|---|---|
| 3,811,730 | A | * | 5/1974 | Dane, Jr. ............................ | 299/8 |
| 3,971,593 | A | * | 7/1976 | Porte et al. ........................ | 299/8 |
| 4,135,395 | A | * | 1/1979 | Sullivan et al. ............ | 73/861.21 |
| 4,232,903 | A | * | 11/1980 | Welling et al. ..................... | 299/8 |
| 4,322,897 | A | * | 4/1982 | Brassfield ........................ | 37/322 |
| 4,429,622 | A | * | 2/1984 | Taylor ................................ | 92/93 |
| 4,718,835 | A | * | 1/1988 | Maruyama .................... | 417/171 |
| 5,199,767 | A | * | 4/1993 | Jimbo ................................ | 299/8 |
| 6,748,679 | B2 | * | 6/2004 | Myers, Jr. ........................ | 37/315 |
| 2009/0200037 | A1 | * | 8/2009 | Fossli ............................ | 166/358 |
| 2009/0284068 | A1 | * | 11/2009 | Yu et al. ......................... | 299/1.9 |

\* cited by examiner

*Primary Examiner* — Ronald Hartman, Jr.
(74) *Attorney, Agent, or Firm* — Cantor Colburn LLP

(57) ABSTRACT

Disclosed herein is a velocity and concentration adjustable coupling pipe apparatus equipped between a lifting pipe and a collector. The apparatus includes a coupling pipe having a lower inlet and an upper outlet which are different in diameter from each other. A seawater inlet pipe passes through a side surface of the coupling pipe to permit inflow of seawater. A slurry flow control valve is provided in the coupling pipe to control the inflow of slurry. A seawater flow control valve is provided in the seawater inlet pipe to control the inflow of the seawater. A first sensor measures concentration of slurry discharged through the upper outlet. A second sensor measures velocity of the discharged slurry. A third sensor measures velocity of slurry introduced into the lower inlet. A control panel controls the opening ratio of each of the slurry and seawater flow control valves.

4 Claims, 5 Drawing Sheets

FIG. 3
*Prior Art*
(a)
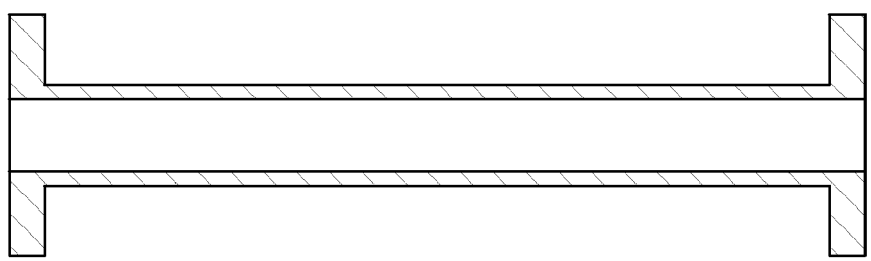
(b)
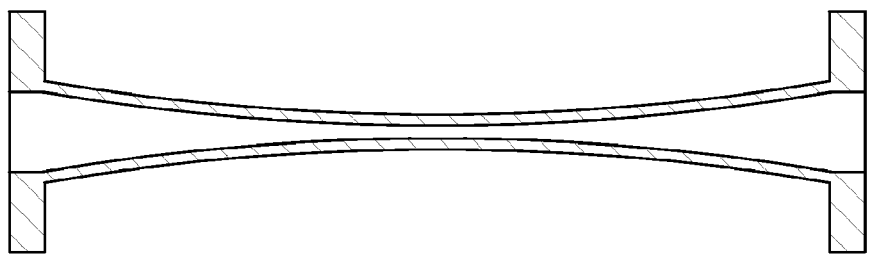

VELOCITY AND CONCENTRATION ADJUSTABLE COUPLING PIPE APPARATUS EQUIPPED BETWEEN LIFTING PIPE AND COLLECTOR

BACKGROUND OF THE INVENTION

1. Field of the Invention

The present invention relates generally to a velocity and concentration adjustable coupling pipe apparatus equipped between a lifting pipe and a collector and, more particularly, to a coupling pipe apparatus which is constructed to, prior to supplying slurry to a lifting pipe, control the velocity and concentration of slurry, thus preventing the slurry containing manganese nodule, fed through a collector when mining the manganese nodule from the ocean floor of the deep sea onto the sea surface, from damaging the lifting pipe or a lifting pump because of a difference in pipe diameter.

2. Description of the Related Art

As the demand for mineral resources increases all over the world, marine mineral resources have been coming into the spotlight as an alternative. Among them, manganese nodule found on the floor of the deep sea has flat or spherical shape and is blackish brown and non-crystalline substances. When collecting the manganese nodule, it is soft. Meanwhile, when the manganese nodule dries, it becomes hardened and thus breaks easily.

The main constituents of manganese nodule are manganese, iron, silica, and water, and the manganese nodule varies in the composition of minor constituents depending on the region. There are several theories about the formation of the manganese nodule, the precipitation of colloidal hydroxides, and the catalysis of iron oxide. The manganese nodule is buried in the deep sea at depths of from 4000 to 5000 m. It is reported that the growth rate of manganese nodule is about 0.01 to 1 mm per every 1000 years.

As shown in FIG. 1, a system for mining the manganese nodule from the floor of the deep sea includes a collector which collects the manganese nodule from the floor of the deep sea, lifting pipes which are coupled to the collector to continuously transfer the manganese nodule onto the sea and comprise flexible pipes, and a lifting pump which provides transfer force to the lifting pipes, and a marine onboard processor which is coupled to an upper lifting pipe coupled to the lifting pump and processes or stores the collected manganese nodule.

However, in the conventional system for mining the manganese nodule from the floor of the deep sea as shown in FIG. 1, the diameters of the lifting pipe and the collector used when mining the manganese nodule may differ as shown in FIG. 2 which is a sectional view illustrating a coupling structure between the lifting pipe and the collector. That is, when the diameter of the lifting pipe is large, the pipe diameter of the collector is small and the lifting pipe and the collector are simply coupled to each other via an expansion pipe, a difference in velocity occurs depending on the size of pipe so that the velocity at the collector increases. According to the law of conservation of mass, the mass passing through the collector must be equal to the mass passing through the lifting system, that is, the lifting pipe and lifting pump. However, a difference in sectional area results in a difference in velocity.

Referring to the following equation, volume flow which is changed into mass flow passing through the pipe must be constant regardless of the diameter of pipe. This is represented by the following equation. large $$Q = Q_{large} = Q_{small}$$

Here, $Q_{large}$ is the volume flow when passing through a pipe having a larger diameter, and $Q_{small}$ is the volume flow when passing through a pipe having a smaller diameter.

The above equation is also expressed as follows.

$$A_{large}v_{large} = A_{small}v_{small}$$

In this equation, $A_{large}$ and $v_{large}$ are the sectional area and velocity of the pipe having a larger diameter, and $A_{small}$ and $v_{small}$ are the sectional area and velocity of the pipe having a smaller diameter.

The above equation may also be expressed as follows.

$$\frac{\pi}{4}D_{large}^2 v_{large} = \frac{\pi}{4}D_{small}^2 v_{small}$$

Here, $D_{large}$ and $D_{small}$ are the diameter of a large pipe and the diameter of a small pipe, respectively.

In this equation, assuming that volume flow is constant, the larger the diameter of the pipe is, the smaller the velocity is. Further, the smaller the diameter of the pipe is, the larger the velocity is. Thus, the equation of $v_{large} < v_{small}$ is obtained.

Thereby, the velocity of the collector increases, thus negatively affecting stable operation of the collector. A velocity which exceeds a predetermined velocity in a pipe hinders the smooth operation of a pipe wall or the collector.

Particularly, the velocity of particles damages and causes vibration of the pipe wall of the collector. Further, a high velocity increases the velocity of lifting the manganese nodule, thus leading to the damage of the manganese nodule.

Therefore, the velocity of slurry containing the manganese nodule and flowing into the mining system must be constant and must be maintained at a proper velocity or less.

As stated above, in order to stably operate the lifting pump, a predetermined flow rate must be maintained; however, if the diameter of the collector is different from that of the lifting pipe constituting the lifting system, a proper amount of slurry which is the mixture of manganese nodule, seawater and mud does not flow into the lifting system (lifting pipe+lifting pump). In this case, negative pressure is applied to the lifting pipe which is a flexible pipe which couples the lifting pump to the collector. This causes the deformation of the lifting pipe which is the flexible pipe, as shown in FIGS. 3A and 3B, thus blocking the lifting pipe and reducing a flow rate. This causes a larger negative pressure to be applied to the lifting pipe. In order to overcome the problem, the elastic modulus of the lifting pipe which is used must be increased to resist the negative pressure. However, this lowers the elasticity of the lifting pipe which is the flexible pipe, thus hindering the entire system from being smoothly operated at the time of lifting.

Therefore, in order to solve the above problem, a proper amount must be flow into the lifting system. However, it is impossible for the simple expansion pipe of FIG. 2 to realize the inflow of the proper amount.

Further, it is necessary to control the concentration of slurry flowing into the lifting system. As the volume of manganese nodule increases, it affects the load of a motor of the lifting pump, thus causing the motor to be overloaded. In order to prevent the motor from overloading, it is required to appropriately control the concentration of the slurry fed into the collector.

The lifting pump is designed to transfer slurry containing a certain amount of manganese nodule as well as mud. If the concentration of the slurry is high, mass which is to be transferred by the lifting pump is increased and thus the load acting on the motor is increased. Thus, the concentration of slurry fed into the lifting pump, that is, slurry containing seawater, manganese nodule and mud of the ocean floor must be kept constant. In order to achieve it, the following equation is used.
Solids Out The concentration $S_{con}$ of slurry is as follows:

$$S_{con} = 100s \frac{\text{Solids Out}}{\text{Liquid Out} + \text{Solids Out}} (\text{wt. \%})$$

In this equation, $S_{con}$ is the concentration of slurry and Solids Out is the volume flow of manganese nodule which is discharged or introduced, and Liquid Out is the volume flow of seawater which is discharged or introduced.

Thus, when Solids Out increases, Liquid Out must be increased so as to keep $S_{con}$ constant. Therefore, the inflow of seawater into the lifting pump must be increased. Consequently, by keeping the concentration of slurry flowing into the lifting pump constant, load applied to the motor of the lifting pump can be kept constant.

Further, there is a case where an increase in the inflow amount of seawater is required. That is, when the lifting system is temporarily blocked because of the inflow of an excess of manganese nodule, the inflow of seawater needs to be increased in comparison with the inflow of manganese nodule so as to prevent temporary blocking. Thus, a system for increasing only the amount of seawater is required.

That is, when an excessive amount of manganese nodule enter the lifting system having the lifting pump and the lifting pipe, an impeller or a discharge casing of the lifting pump may be blocked. In order to solve the problem, the concentration of manganese nodule must be kept constant. However, the simple expansion pipe of FIG. 2 or the lifting system which does not consider the inflow of external seawater cannot avoid the above-mentioned problem. Thus, when an amount of manganese nodule exceeding a predetermined amount flows into the collector, a predetermined amount of seawater must be additionally fed into the lifting system so as to control the concentration of manganese nodule fed into the lifting system.

Further, when the lifting system and the collector are operated for a predetermined period of time and then stop operating, manganese nodule or residual materials of mud may be caught between the impeller and an impeller casing surrounding the impeller in the lifting pump. This restrains operation of the impeller, so that the impeller does not rotate and thus the motor may burn out. In order to solve such a serious problem, the inflow of only seawater into the lifting system is required without slurry after the operation so as to remove remaining slurry and remove slurry from the lifting system for a subsequently occurring operation.

SUMMARY OF THE INVENTION

Accordingly, the present invention has been made keeping in mind the above problems occurring in the prior art, and an object of the present invention is to provide a coupling pipe apparatus between a lifting pipe and a collector, which eliminates a change of a velocity attributable to non-uniformity in pipe diameter between the lifting pipe and the collector, thus minimizing the negative influence on the collector.

Another object of the present invention is to provide a coupling pipe apparatus between a lifting pipe and a collector, which decreases load acting on a motor of a lifting pump as concentration increases because of non-uniformity in volume concentration of manganese nodule, thus reducing load acting on the motor and providing a uniform concentration.

A further object of the present invention is to provide a coupling pipe apparatus between a lifting pipe and a collector, which prevents a lifting system from temporarily clogging up because of an excessive amount of manganese nodule being introduced into the system.

Yet another object of the present invention is to provide a coupling pipe apparatus between a lifting pipe and a collector, which is intended to remove the remaining slurry from a lifting system after the lifting system is operated.

In order to accomplish the above objects, the present invention provides a velocity and concentration adjustable coupling pipe apparatus equipped between a lifting pipe and a collector of a mining system having a collector, a lifting pipe, a lifting pump, and an onboard processor to mine manganese nodule from a floor of a deep sea, the coupling pipe apparatus including a coupling pipe having a lower inlet and an upper outlet which are different in diameter from each other, a seawater inlet pipe passing through a side surface of the coupling pipe to permit inflow of seawater, a slurry flow control valve provided in the coupling pipe and opening or closing to control an inflow of slurry, a seawater flow control valve provided in the seawater inlet pipe and opening or closing to control an inflow of the seawater, a first sensor measuring a concentration of slurry discharged through the upper outlet, a second sensor measuring a velocity of slurry discharged through the upper outlet, a third sensor measuring a velocity of slurry introduced into the lower inlet, and a control panel connected to the first sensor, the second sensor and the third sensor via a circuit, thus controlling an opening ratio of each of the slurry flow control valve and the seawater flow control valve based on the measured velocity and concentration.

Further, a diameter of the lower inlet coupled to the collector may be smaller than a diameter of the upper outlet coupled to the lifting pipe.

The control panel may perform the steps of measuring velocity using the second sensor and the third sensor, and opening the seawater flow control valve gradually when the velocity measured by the third sensor is larger than a preset value stored in the control panel, thus keeping the velocity measured by the second sensor and the velocity measured by the third sensor uniform, opening the seawater flow control valve gradually when it is determined that a value of concentration measured by the first sensor is larger a preset value, thus reducing the concentration, and proceeding onto the determining step using data of the concentration and velocity measured by the first to third sensors if a stop signal for stopping operation of the lifting system is not transmitted from a ship, and fully opening the seawater flow control valve to remove the manganese nodule and mud from a flexible pipe, the lifting pump and the lifting pipe by washing if there is a stop signal, and thereafter closing the slurry flow control valve.

Further, each of the slurry flow control valve provided in the coupling pipe and the seawater flow control valve provided in the seawater inlet pipe may include a disc-shaped valve member rotatably provided in an inner circumference of each of the slurry flow control valve and the seawater flow control valve, and a motor coupled to the disc-shaped valve member via a shaft and rotating the disc-shaped valve member, whereby the motor is operated under control of the control panel to rotate the disc-shaped valve member.

BRIEF DESCRIPTION OF THE DRAWINGS

The above and other objects, features and advantages of the present invention will be more clearly understood from the following detailed description taken in conjunction with the accompanying drawings, in which:

FIGS. 3A and 3B are views illustrating the deformation of a conventional lifting pipe which comprises a flexible pipe;

DESCRIPTION OF THE PREFERRED EMBODIMENTS

The construction and operation of an embodiment of the present invention will be described below in detail with reference to the accompanying drawings. Further, when it is determined that the detailed description of the known art related to the present invention may obscure the gist of the present invention, the detailed description will be omitted.

Figure 1:
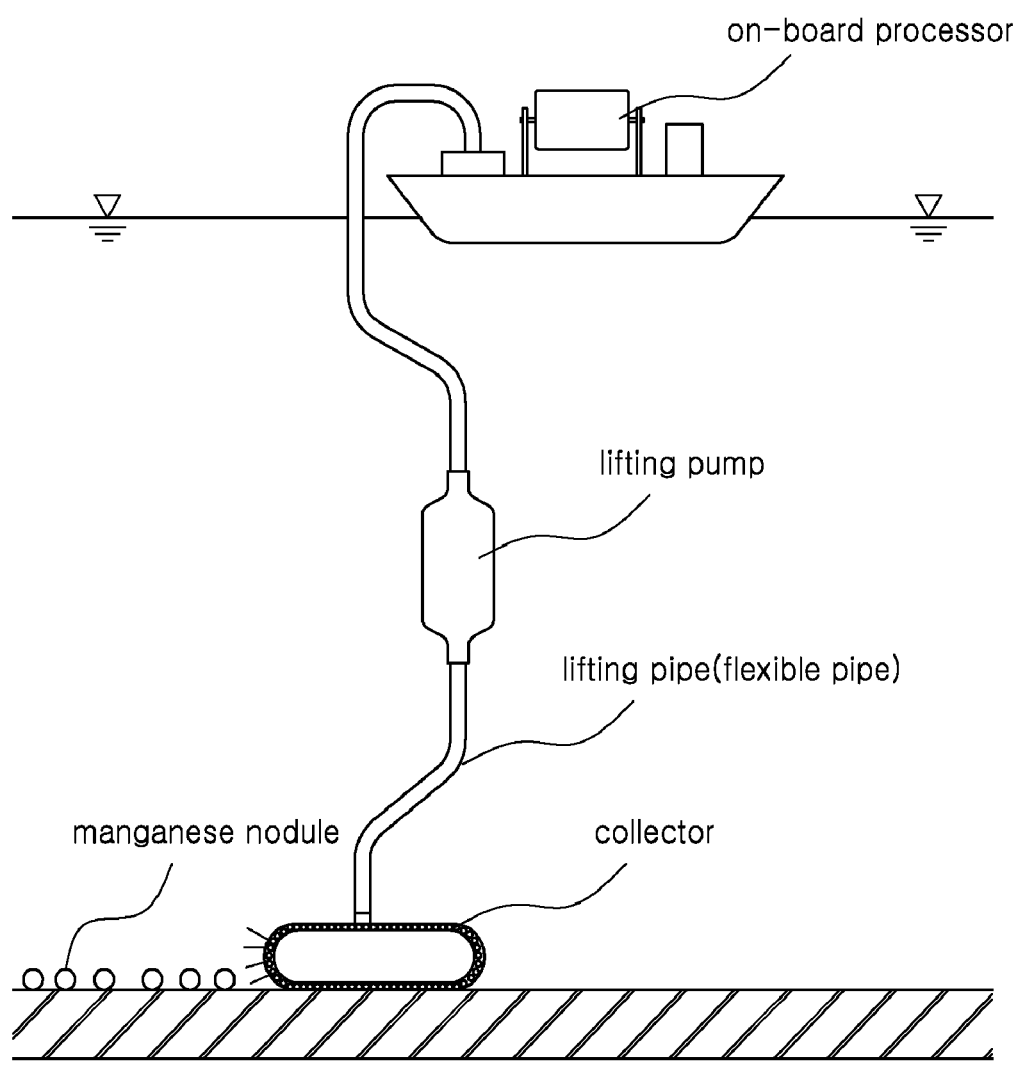
FIG. 1 is a schematic view illustrating a conventional manganese nodule mining system.
Figure 2:
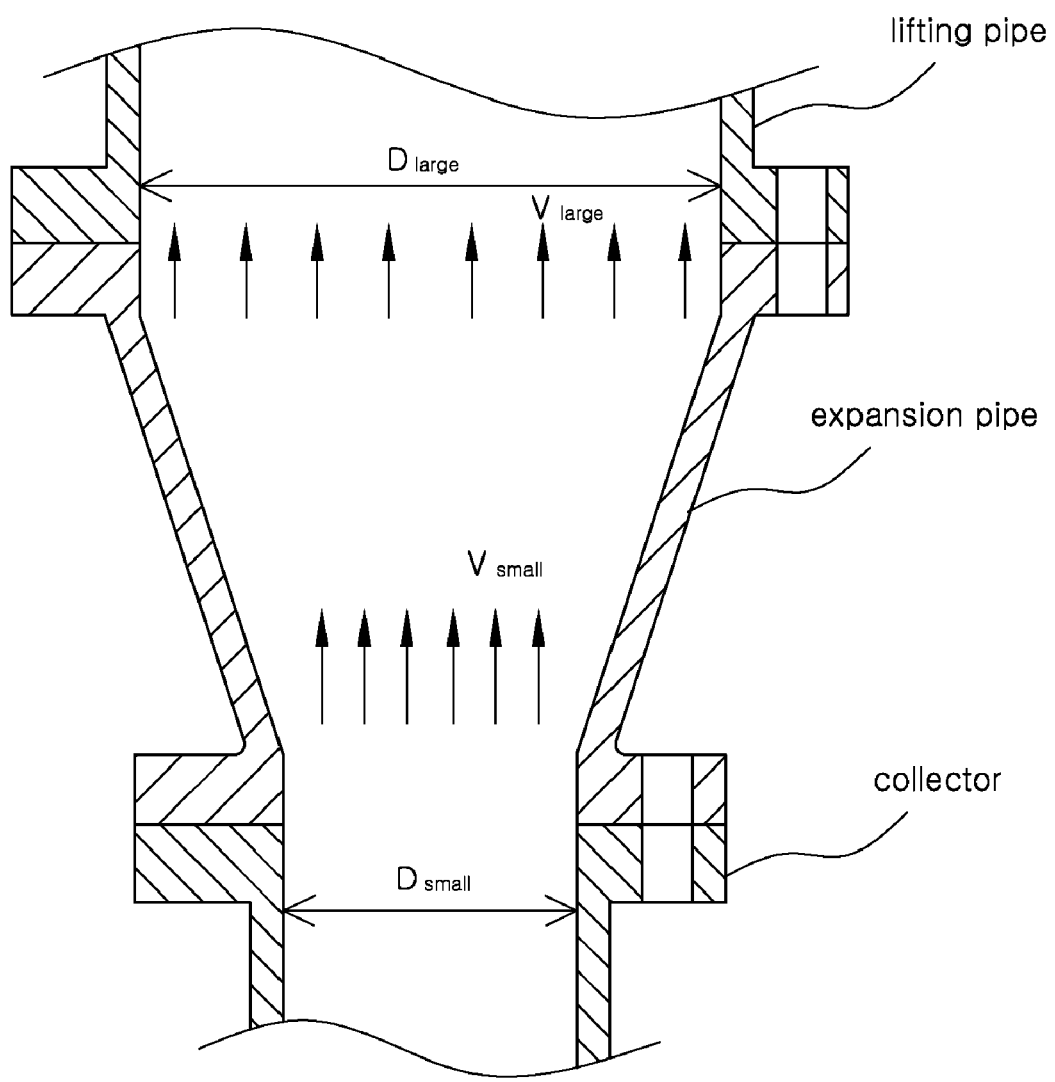
FIG. 2 is a sectional view illustrating a conventional coupling structure between a lifting pipe and a collector.
Figure 4:
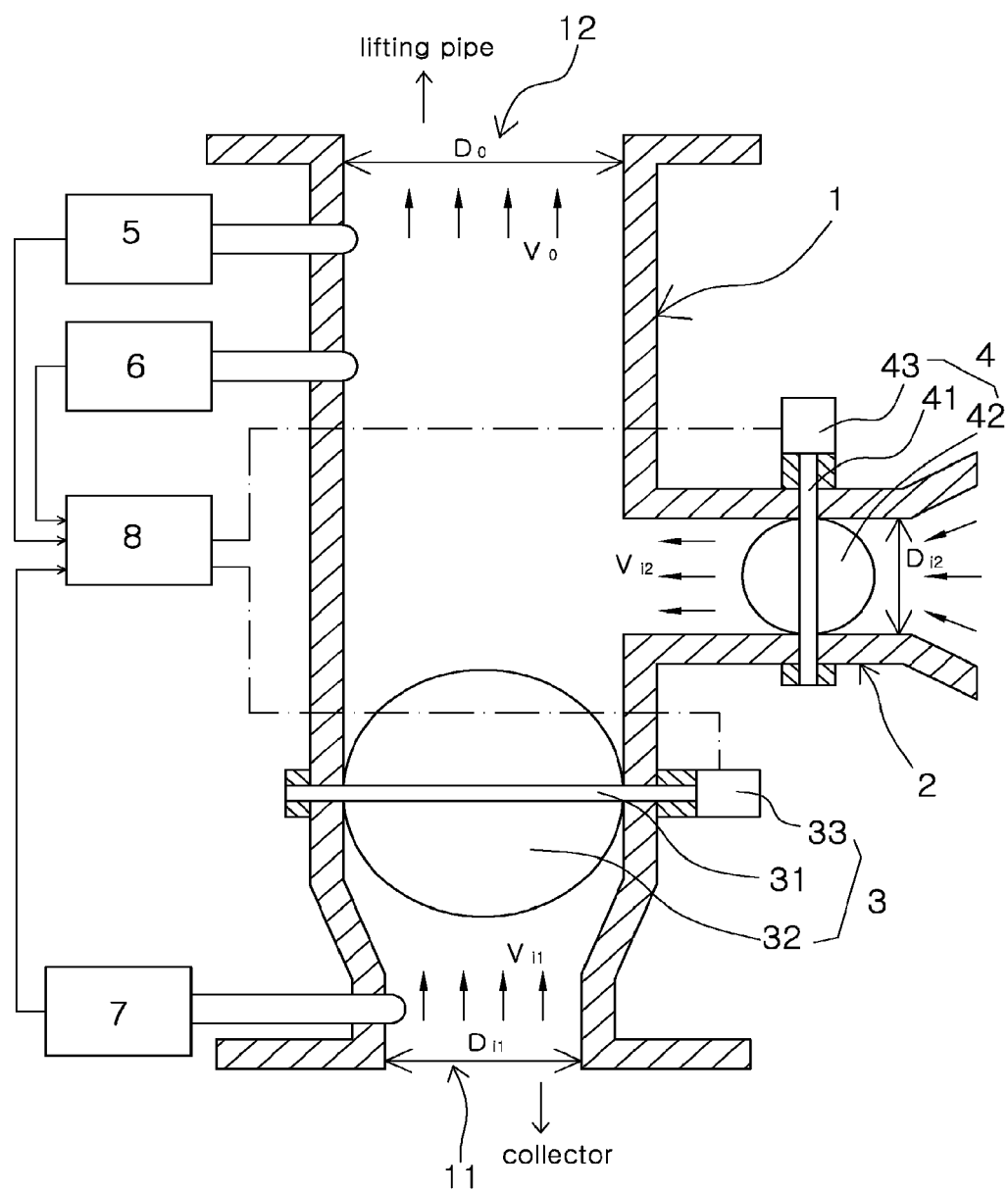
FIG. 4 is a view illustrating the construction of a coupling pipe apparatus according to the present invention.
Figure 5:
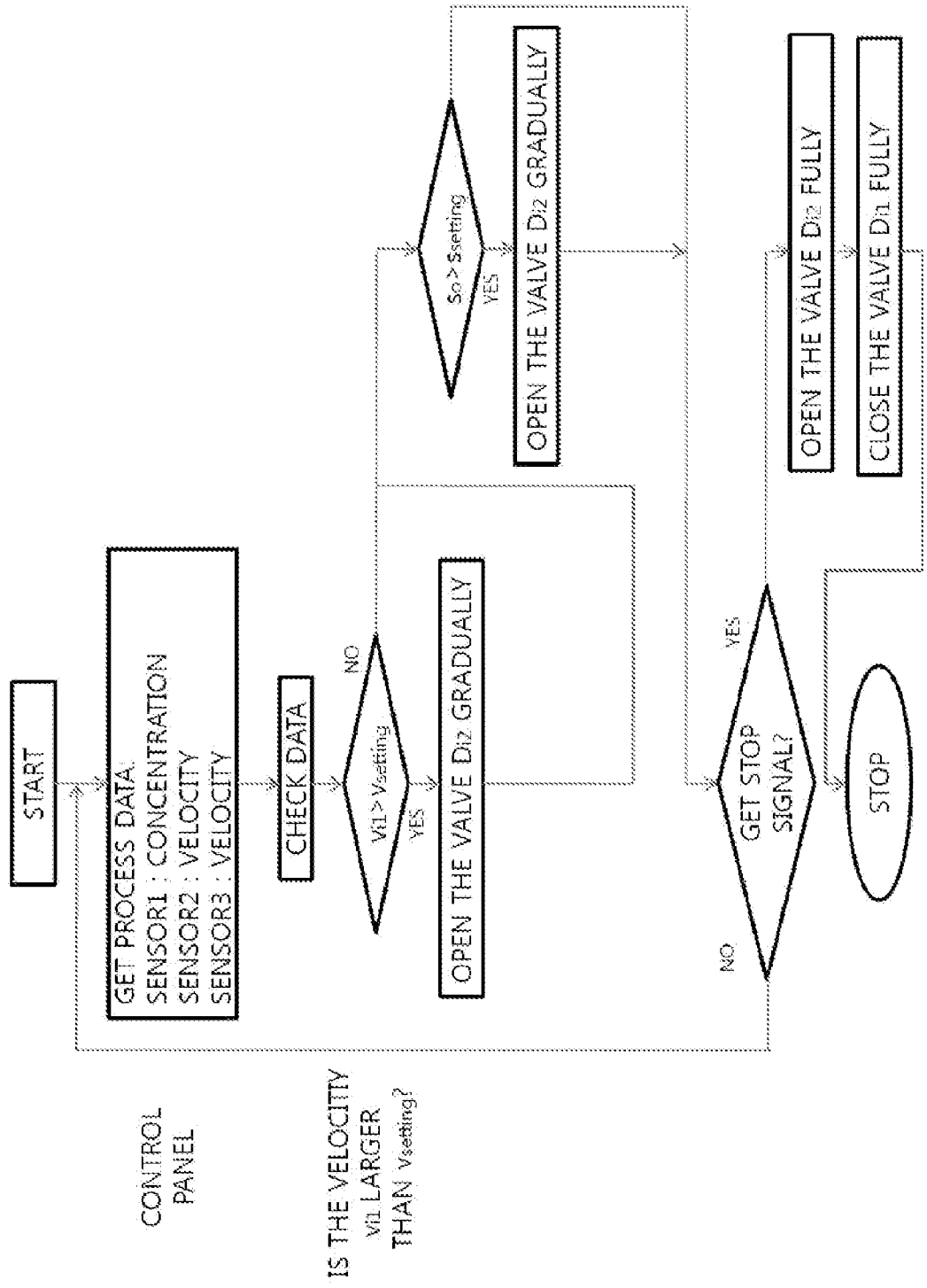
FIG. 5 is a control flowchart of the coupling pipe apparatus according to the present invention.

FIG. 4 is a view illustrating the construction of a coupling pipe apparatus according to the present invention, and FIG. 5 is a control flowchart of the coupling pipe apparatus according to the present invention. Referring to the drawings, the coupling pipe apparatus of the present invention includes a coupling pipe 1 which includes a lower inlet 11 having a predetermined diameter $D_{i1}$ and an upper outlet 12 having a predetermined diameter $D_0$. The lower inlet 11 and the upper outlet 12 are connected, respectively, to a collector for collecting manganese nodule and a lifting pipe for feeding the manganese nodule from the collector. Here, the diameter $D_{i1}$ of the lower inlet 11 is different from the diameter $D_0$ of the upper outlet 12. Particularly, the diameter of the lower portion is smaller than that of the upper portion. Thus, in order to couple the portions having different diameters to each other, the coupling pipe has the structure of an expansion pipe which is enlarged such that an upper portion is larger than a lower portion. The present invention solves the problems of a conventional coupling pipe which has the shape of an expansion pipe, owing to other components of the present invention as well as the expansion pipe.

The lower inlet 11 of the coupling pipe 1 is fastened to the collector and the upper outlet 12 of the coupling pipe 1 is fastened to the lifting pipe via fastening means which are not shown in the drawings. Examples of the fastening means includes a sealant, a bolt, a nut, and other pipe couplers.

The coupling pipe apparatus according to the present invention includes a seawater inlet pipe 2 which passes through a surface of the coupling pipe 1 and has a predetermined diameter Di2 to allow seawater to be introduced into the coupling pipe 1.

Further, according to the present invention, a slurry flow control valve 3 is installed at the position in the coupling pipe 1 at which the expansion of the diameter is stopped when the diameter of the coupling pipe 1 is increased from the lower inlet 11 having a diameter smaller than that of the upper outlet 12, and is open or closed to control the inflow of the slurry which is introduced into the coupling pipe 1 and is the mixture of manganese nodule, seawater and mud.

Further, according to the present invention, a seawater flow control valve 4 is installed at a predetermined position in the seawater inlet pipe 2 and is open or closed to control the inflow of seawater which is introduced into the seawater inlet pipe 2.

The slurry flow control valve 3 and the seawater flow control valve 4 are constructed to open or close the interior of the coupling pipe 1 and the interior of the seawater inlet pipe 2, respectively.

Preferably, the slurry flow control valve 3 and the seawater flow control valve 4 comprise butterfly valves. That is, the slurry flow control valve 3 and the seawater flow control valve 4 have disc-shaped valve members 32 and 42 which rotate about shafts 31 and 41, respectively, to be open or closed. Further, unlike a general lever type of butterfly valve, in order to guarantee precise control at the floor of the deep sea, a first motor 33 and a second motor 43 comprising a servo motor or hydraulic motor as the driving source of each valve are installed at the slurry flow control valve 3 and the seawater flow control valve 4, respectively, such that the butterfly valve is rotated by the rotation of each shaft. Here, each of the motors 33 and 43 has a watertight structure.

Further, a plurality of concentration sensors and velocity sensors are mounted to the coupling pipe 1 to measure concentration and velocity. A first sensor 5 measuring the concentration of the slurry mixed with the seawater and a second sensor 6 measuring the velocity of the slurry mixed with the seawater, before the slurry is discharged through the upper outlet 12, are provided at predetermined positions of the coupling pipe 1. That is, the first sensor 5 and the second sensor 6 are provided on the upper portion of the coupling pipe 1 in such a way as to be positioned above the slurry flow control valve 3 which is provided on the lower portion of the coupling pipe 1.

The concentration and velocity sensors may be any one of common sensors.

Further, a third sensor 7 is provided at a predetermined position of the coupling pipe 1 to measure the velocity of the slurry flowing into the lower inlet 11. The third sensor 7 is preferably installed between the slurry flow control valve 3 and the lower inlet 11.

Further, according to the present invention, a control panel 8 is connected to the first sensor 5, the second sensor 6 and the third sensor 7 via a circuit, and controls the opening ratio of each of the slurry flow control valve 3 and the seawater flow control valve 4 according to the measured data. The control panel 8 may be installed in the water. However, the control panel 8 is usually installed in an onboard processor or mining vessel.

After the first to third sensors measure the concentration and velocity of the slurry, the control panel 8 performs calculation, comparison between the measured values and preset values, or direct control to control the first motor 33 of the slurry flow control valve 3 and the second motor 43 of the seawater flow control valve 4, thus precisely controlling the inflow of the slurry and seawater.

The control panel 8 is preferably connected to the first motor 33 and the second motor 43 using wires. However, a wireless connection between the control panel 8 and the first and second motors 33 and 43 may be done so as to enable the motors 33 and 43 to be remotely operated. Since the construction of remotely operating the motors is a general construction, a detailed description will be omitted herein.

Although not shown in the drawings, a power line is connected to the first motor 33 and the second motor 43 to supply power from the onboard processor or mining vessel to the first and second motors 33 and 43.

In the coupling pipe apparatus of the present invention constructed as described above, a mixture of mud, manganese nodule and seawater flows into the lower inlet 11 which is coupled to the collector and has the diameter $D_{i1}$.

The slurry flowing into the coupling pipe apparatus in this way is mixed with seawater flowing into the seawater inlet pipe 2 of the diameter $D_{i2}$, thus reducing the concentration of the slurry, prior to being fed to the lifting system (lifting pipe and lifting pump).

Since $D_o > D_{i1}$, $v_o < v_{i1}$ is satisfied.

Assuming that $D_o$=300 mm and $D_{i1}$=200 mm, $$v_{i1} = \left(\frac{300}{200}\right)^2 s4.5 \text{ m/s} = 10.125 \text{ m/s}$$

when $v_o$=4.5 m/s. This overworks the collector, resulting in damage to or malfunction of the collector.

Thus, in order to feed slurry from the collector at the velocity of 4.5 m/s, which is the same as the velocity of 4.5 m/s at which a predetermined amount of seawater is fed from a seawater inlet having the diameter of 200 mm to the lifting system, a predetermined amount of seawater must flow into the seawater inlet having diameter $D_{i2}$. For this end, the velocity is calculated as follows.

Since volume flow of inflow into the lifting system must be equal to the sum of the volume flow of inflow into the collector and volume flow of seawater into the seawater inlet, the following equations are obtained:

$$Q_o = Q_{i1} + Q_{i2}$$

$$A_o v_o = A_{i1} v_{i1} + A_{i2} v_{i2}$$

Meanwhile, $v_o = v_{i1} = 4.5$ m/s and, $$A_o = \frac{\pi}{4} D_o^2 = \frac{\pi}{4} s 0.3^2.$$

Further, since $$A_{i1} = \frac{\pi}{4} s D_{i1}^2 = \frac{\pi}{4} s 0.2^2 \text{ and } A_{i2} = \frac{\pi}{4} s D_{i2}^2 = \frac{\pi}{4} s 0.2^2,$$

the substitution of them for the above equation leads to the following result.

$$\frac{\pi}{4} D_o^2 s v_o = \frac{\pi}{4} D_{i1}^2 s v_{i1} + \frac{\pi}{4} D_{i2}^2 s v_{i2}$$

$$D_o^2 s v_o = D_{i1}^2 s v_{i1} + D_{i2}^2 s v_{i2}$$

$$v_{i2} = \frac{D_o^2 - D_{i1}^2 s v_{i1}}{D_{i2}^2} = \frac{0.3^2 s 4.5 - 0.2^2 s 4.5}{0.2^2} = 5.625 \text{ m/s}$$

As shown in the above equation and result, the inflow velocity to the collector is set to be equal to the velocity of seawater fed to the lifting system.

The above process is controlled as shown in the flowchart of FIG. 5.

Referring to FIG. 5, the second sensor 6 measures the velocity of slurry mixed with seawater and the third sensor 7 measures the velocity of introduced slurry. If the velocity measured by the third sensor 7 is larger than a preset value stored in the control panel 8, the control panel 8 gradually opens the seawater flow control valve 4 such that the velocity measured by the second sensor 6 is equal to the velocity measured by the third sensor 7.

Further, the equation for the process of keeping the concentration of slurry flowing into the lifting system constant is equal to the equation for calculating the concentration $S_{con}$ of slurry.

$$S_{con} = 100s \frac{\text{Solids Out}}{\text{Liquid Out} + \text{Solids Out}} (\text{wt. \%})$$

In this equation, Solids Out is the volume flow of solid containing manganese nodule and flowing into the lifting system, and Liquid Out is the volume flow of seawater. The Solids Out is introduced into only the collector, and the Liquid Out is introduced into the seawater inlet as well as the collector.

Thus, if $S_{con}$ is larger than a predetermined concentration, this means that a larger amount of solid is introduced into the lifting system or solid including manganese nodule is larger than seawater. This applies an excessive load to the motor of the lifting pump.

This obstructs the stable operation of the motor. The reason is because the overload of the motor induces the over-current exceeding the rating thereof and thus the motor may burn out.

Thus, as shown in the above equation, in order to reduce $S_{con}$, the Liquid Out must be controlled because the Solids Out may not be directly controlled.

That is, Liquid Out must be increased. To this end, when the seawater flow control valve 4 for controlling the inflow of seawater is open so that the amount of seawater increases, Liquid Out increases. That is, as a denominator increases in the above equation, $S_{con}$ is reduced.

Further, when the seawater flow control valve 4 for controlling the inflow of seawater is open, negative pressure for sucking slurry from the collector is reduced, so that Solids Out is reduced. Consequently, $S_{con}$ is reduced.

The above process may be performed as shown in the flowchart of FIG. 5.

Referring to FIG. 5, when the second and third sensors 6 and 7 measure velocity and velocity measured by the third sensor 7 is larger than a preset value stored in the control panel 8, the control panel 8 gradually opens the seawater flow control valve 4 such that the velocity measured by the second sensor 6 is equal to the velocity measured by the third sensor 7. Thereafter, it is determined whether the value of the concentration measured by the first sensor 5 is larger than a preset value or not. Here, when it is determined that the value of concentration is larger than the preset value, the control panel 8 gradually opens the seawater flow control valve 4, thus reducing the concentration.

Afterwards, if there is no 'stop signal of the lifting system' which stops operation of the lifting system, the process proceeds to the initial determination step using the concentration and velocity measured by the first to third sensors. If there is a stop signal, the flexible pipe, the lifting pump and the lifting pipe need to be washed by seawater so as to remove manganese nodule and mud from the flexible pipe, the lifting pump and the lifting pipe. To this end, the seawater flow control valve 4 fully opens. Thereafter, the slurry flow control valve 3 is closed.

As described above, the present invention provides a lifting pipe and collector coupling pipe apparatus to a system for mining manganese nodule from the floor of the deep sea, including a collector collecting manganese nodule from the floor of the deep sea, a lifting pipe connected to the collector to continuously feed manganese nodule onto the sea surface and comprising a flexible pipe, a lifting pump providing transfer force to the lifting pipe, and an onboard processor connected to an upper lifting pipe connected to the lifting pump, thus eliminating a change of velocity attributable to a difference in diameter between the lifting pipe and the collector, therefore minimizing the negative influence on the collector.

The present invention is advantageous in that the load acting on a motor of a lifting pump because of an increase in concentration attributable to the non-uniformity of volume concentration of manganese nodule can be reduced, thus reducing the load acting on the motor and providing uniform concentration.

The present invention is advantageous in that it prevents a lifting system from becoming temporarily blocked because of the inflow of an excess of manganese nodule.

Further, the present invention is advantageous in that it can remove slurry from a lifting system after the lifting system has been put into operation. As such, the present invention is useful and has high industrial applicability.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A velocity and concentration adjustable coupling pipe apparatus equipped between a lifting pipe and a collector of a mining system having a collector, a lifting pipe, a lifting pump, and an onboard processor to mine manganese nodule from a floor of a deep sea, the coupling pipe apparatus comprising:
   a coupling pipe having a lower inlet and an upper outlet which are different in diameter from each other;
   a seawater inlet pipe passing through a side surface of the coupling pipe to permit inflow of seawater;
   a slurry flow control valve provided in the coupling pipe, and opening or closing to control an inflow of slurry;
   a seawater flow control valve provided in the seawater inlet pipe, and opening or closing to control an inflow of the seawater;
   a first sensor measuring a concentration of slurry discharged through the upper outlet;
   a second sensor measuring a velocity of slurry discharged through the upper outlet;
   a third sensor measuring a velocity of slurry introduced into the lower inlet; and
   a control panel connected to the first sensor, the second sensor and the third sensor via a circuit, thus controlling an opening ratio of each of the slurry flow control valve and the seawater flow control valve based on the measured velocity and concentration.

2. The coupling pipe apparatus as set forth in claim 1, wherein a diameter of the lower inlet coupled to the collector is smaller than a diameter of the upper outlet coupled to the lifting pipe.

3. The coupling pipe apparatus as set forth in claim 1, wherein the control panel performs the steps of:
   measuring velocity using the second sensor and the third sensor, and opening the seawater flow control valve gradually when the velocity measured by the third sensor is larger than a preset value stored in the control panel, thus keeping the velocity measured by the second sensor and the velocity measured by the third sensor uniform;
   opening the seawater flow control valve gradually when it is determined that a value of concentration measured by the first sensor is larger a preset value, thus reducing the concentration; and
   proceeding onto the determining step using data of the concentration and velocity measured by the first to third sensors if a stop signal for stopping operation of the lifting system is not transmitted from a ship, and fully opening the seawater flow control valve to remove the manganese nodule and mud from a flexible pipe, the lifting pump and the lifting pipe by washing if there is a stop signal, and thereafter closing the slurry flow control valve.

4. The coupling pipe apparatus as set forth in claim 1, wherein each of the slurry flow control valve provided in the coupling pipe and the seawater flow control valve provided in the seawater inlet pipe comprises:
   a disc-shaped valve member rotatably provided in an inner circumference of each of the slurry flow control valve and the seawater flow control valve; and
   a motor coupled to the disc-shaped valve member via a shaft and rotating the disc-shaped valve member,
   whereby the motor is operated under control of the control panel to rotate the disc-shaped valve member.

* * * * *